United States Patent [19]
Collette et al.

[11] Patent Number: 5,994,419
[45] Date of Patent: Nov. 30, 1999

[54] PREPARATION OF RAPIDLY DISSOLVING/ ABSORBING POWDERS OF HYDROPHILIC/ SUPER ABSORBENT (CO)POLYMERS

[75] Inventors: Christian Collette, Paris; Manuel Hidalgo, Bois-Colombes; Jean-Marc Corpart, Sannois; André Kowalik, Gouvieux; Paul Mallo, Chatou, all of France

[73] Assignee: Elf Atochem S.A., Puteaux, France

[21] Appl. No.: 08/970,608

[22] Filed: Nov. 14, 1997

[30] Foreign Application Priority Data

Nov. 14, 1996 [FR] France ................................ 96 13890

[51] Int. Cl.$^6$ ................................ C08J 9/28; C08F 2/00
[52] U.S. Cl. ................................ 521/64; 521/61; 521/62; 521/63; 526/201; 526/207; 526/213; 526/215
[58] Field of Search ................................ 521/61, 62, 63, 521/64; 526/201, 207, 213, 215

[56] References Cited

U.S. PATENT DOCUMENTS

| 3,255,127 | 6/1966 | von Bonin et al. ................ 521/64 |
| 3,256,219 | 6/1966 | Will ................................ 521/64 |
| 3,957,739 | 5/1976 | Cabestany et al. ................ 526/210 |
| 4,093,776 | 6/1978 | Aoki et al. ................ 526/207 |
| 5,633,291 | 5/1997 | Dryer et al. ................ 521/64 |

FOREIGN PATENT DOCUMENTS

| 0441507 | 8/1991 | European Pat. Off. . |
| 0583177 | 2/1994 | European Pat. Off. . |
| 0638592 | 2/1995 | European Pat. Off. . |
| 2207140 | 1/1989 | United Kingdom . |

*Primary Examiner*—Morton Foelak
*Attorney, Agent, or Firm*—Burns, Doane, Swecker & Mathis, L.L.P.

[57] ABSTRACT

Rapidly dissolving/absorbing free-flowing powders of hydrophilic/superabsorbent (co)polymers, having irregular nonspherical morphology and a particle size distribution ranging from 100 μm to 800 μm, are prepared by (a) phase inversion (co)polymerizing stirred admixture of (i) a hydrocarbonic solution of at least one surfactant having an HBL ranging from 8 to 12 and (ii) an aqueous solution of at least one hydrophilic unsaturated monomer, in the presence of an effective amount of a radical polymerization initiator and at a predetermined temperature of (co)polymerization, (b) next introducing into the medium of (co)polymerization, after (co)polymerization of the at least one hydrophilic unsaturated monomer, a second aqueous solution of at least one hydrophilic unsaturated monomer, (c) then (co)polymerizing the second aqueous solution, and (d) thence extracting the hydrocarbonic phase and water from the resulting (co)polymerizate and drying same, with the proviso (e) that the second aqueous monomer solution is introduced at a temperature of about the predetermined temperature of (co)polymerization and the volumetric ratio of aqueous phase to hydrocarbonic phase ranges from 0.6 to 1.2.

14 Claims, No Drawings

PREPARATION OF RAPIDLY DISSOLVING/ ABSORBING POWDERS OF HYDROPHILIC/ SUPER ABSORBENT (CO)POLYMERS

BACKGROUND OF THE INVENTION

1. Technical Field of the Invention

The present invention relates to the preparation of hydrophilic polymers and copolymers in powder form, the principal characteristic of which is, if they are not crosslinked, the high speed at which they dissolve in water, and which are well suited, inter alia, as flocculants for water treatments, as sludge- dehydrating agents, as thickeners, or else as retention agents in the papermaking industry and, if they are partially crosslinked, their high absorption of water and of aqueous fluids, which renders them well suited as superabsorbents, both for the production of articles of hygiene and for cable manufacture.

The hydrophilic polymers and copolymers according to the present invention are the linear or branched, uncrosslinked or partially crosslinked (co)polymers having a molecular weight of several million daltons, which are prepared via polymerization in a disperse medium, in the first stage of any which process the continuous phase is an organic phase and the disperse phase an aqueous solution of the constituent (co)monomers.

2. Description of the Prior Art

The aforesaid so-called inverse suspension polymerization techniques have long been known to this art and are described in very many patents. Compare, for example, U.S. Pat. Nos. 3,957,739 and 4,093,776 for a polymerization process in one stage, or EP-441,507 (Sumitomo Seika Chem. Co.) for a process entailing two or more stages of successive introduction of the monomer to be polymerized.

An important parameter which is common to all these techniques is the use of at least one surfactant whose hydro-lipophilic balance (HLB) ranges from 3 to 6 and whose function is to stabilize the inverse suspension.

At termination of these inverse suspension polymerization processes, the ultimate polymer is in the form of a powder of spherical morphology and having a particle size distribution ranging from 50 to 400 $\mu$m, and its dissolving or swelling in water is slow, and this considerably reduces its merit, especially for applications such as the thickening of aqueous solutions or water treatment.

In other inverse suspension polymerization processes, surfactants of HLB of from 8 to 12 have been used, for example those described in EP-36,463 (Seitetsu Kagaku Co) or FR 2,251,573 (Nobel Hoechst Chimie). The inverse suspension is produced therein at low temperature in the same manner as in the preceding techniques, namely, to begin, a dispersion of the aqueous solution of monomers in the form of droplets is established in the organic continuous medium and the temperature is increased to initiate the polymerization. Here, however, an inversion of the phases is observed during the polymerization: a continuous gel forms, which the mechanical effect of the stirring converts into granules whose particle size ranges from 10 $\mu$m to 600 $\mu$m. This phase inversion mechanism has been explained in "Inverse Suspension Polymerization of Acrylamide" in *European Polymer Journal*, vol. 18, pages 639 to 645 (1982). The powder grains thus obtained have a very specific, very distorted or irregular morphology which resembles that of "raspberries" or of "cauliflowers", and no longer that of spherical beads. Their macroporosity is high and consequently their specific surface is on average 3 to 10 times greater than that of a powder of spherical grains of equivalent particle size distribution. This large specific surface plays a very important role in the speed at which the powder dissolves (or swells) in water and aqueous fluids. The kinetics of dissolution of such grains are rapid and, as a result, these powders are of great interest for the above-mentioned applications. However, the great disadvantage presented by these inverse suspension processes with phase inversion is their output efficiency, which is limited as a result of the overloading of the reactor with the organic phase. It has been determined, indeed, that the use of surfactants of HLB of from 8 to 12 does not permit operating at a volumetric ratio of aqueous phase to organic phase (which will be referred to as an A/O ratio hereinafter) which is high. According to the prior art, this ratio is very critical and this is confirmed in industrial practice: it is essential to adopt an A/O ratio lower than 0.6 and preferably lower than 0.5 in order that the initial inverse suspension before polymerization should be stabilized. At A/O ratios higher than 0.6 the surfactant of HLB of from 8 to 12 is no longer capable of ensuring an equilibrium between the coalescence and the rupture of the droplets in suspension and the system sets solid during polymerization.

SUMMARY OF THE INVENTION

A major object of the present invention is the provision of hydrophilic polymers in powder form which are linear, branched, if appropriate crosslinked, exhibiting a high speed of dissolving or swelling in water or aqueous fluids, comprising providing a solution of a surfactant of HLB ranging from 8 to 12 in a hydrocarbon solution and introducing therein, with stirring, an aqueous solution of a hydrophilic unsaturated monomer or of a mixture of hydrophilic unsaturated monomers and developing the polymerization process with phase inversion under the combined effect of a radical polymerization initiator and of temperature, and then, when this monomer charge has polymerized, introducing into the mixture a second charge of hydrophilic unsaturated monomer, or of a mixture of hydrophilic unsaturated monomers, in aqueous solution, and, when this second monomer charge has polymerized, extracting the hydrocarbon phase and the water therefrom by distillation and drying. The subject process further comprises introducing the second monomer charge at the polymerization temperature, and establishing the volume of said aqueous monomer solution such that the volumetric ratio of aqueous phase to hydrocarbon phase ranges from 0.6 to 1.2.

DETAILED DESCRIPTION OF BEST MODE AND SPECIFIC/PREFERRED EMBODIMENTS OF THE INVENTION

More particularly according to the present invention, A/O ratios can be established which are much higher than the optimum A/O ratios of the classical processes ($\leq 0.6$), in practice ranging from 0.6 to 1.2. The output efficiency is considerably improved without the quality of the hydrophilic powders being impaired. Surprisingly and unexpectedly, the "raspberry" morphology of the final powder is not affected at all, its specific surface is not diminished and its particle size distribution remains between 100 and 800 $\mu$m.

In one embodiment of the invention, the first charging of the reactor with the aqueous monomer solution is directly at the polymerization temperature. This embodiment presents the advantage of establishing the set temperature of the reactor more uniform and simpler to control.

Briefly, the present invention features:

(1) Dissolving a surfactant of HLB of from 8 to 12 in an organic phase; after dissolving, the mixture is cooled to a temperature of 10 to 30° C.;

(2) While stirring of the reactant mixture is maintained, an aqueous solution of hydrophilic monomers, prepared separately, cold, and containing a crosslinking agent if appropriate, namely, with a view to preparing crosslinked polymers, is then added continuously in parallel with a solution of a polymerization initiator;

(3) The reactor temperature is increased to the polymerization temperature (according to the present invention, by "polymerization temperature" is intended a temperature at which the polymerization of the monomers is effectively and suitably carried out and which depends, inter alia, on the nature and the amount of the polymerization initiator employed; a representative polymerization temperature is 75° C.±10° C.).

In another embodiment:

(1) A surfactant of HLB ranging from 8 to 12 is dissolved in an organic phase, hot, and the solution thus obtained is adjusted to a set or predetermined temperature selected as the polymerization temperature;

(2) While stirring of the reactant mixture is maintained at the set temperature, an aqueous solution of hydrophilic monomers, prepared separately and containing a crosslinking agent, if appropriate, is added continuously, in parallel with a solution of a polymerization initiator;

(3) At this stage, in either case, polymerization is observed to commence, marked by an exotherm and a change in the appearance of the contents of the reactor (phase change, a Weissenberg effect being observed in the aqueous phase—the aqueous phase, partially gelled, wraps itself around the stirrer shaft, return to the milky latex), which is one of the manifestations of the phase inversion, another being the appreciable increase in the stirrer torque. When this torque has become steady, which indicates that the polymerization with phase inversion is sufficiently advanced, the stirring is continued at the set temperature for approximately thirty minutes to complete the polymerization;

(4) A second monomer charge is then added to the mixture, still maintained at the set temperature, its volume being calculated such that upon completion of the addition a final A/O ratio of 0.6 to 1.2, more particularly of 0.7 to 1.1, is established. When the internal temperature of the reactor returns to the set temperature level, the stirring is continued at the set temperature for approximately thirty minutes to complete the polymerization;

(5) The excess organic phase is lastly removed by filtration and the separated product is subjected to an azeotropic distillation before being dried in a drier with paddles.

In most instances the organic phase is an unreactive hydrocarbon liquid which serves only as a dispersant medium. Hydrocarbon liquids which are suitable for the present invention include products that are chemically inert in respect of the monomers and the polymers formed. They must form an azeotrope with water in order that the latter may be removed by azeotropic distillation; when this condition is not fulfilled, agglomerates are obtained instead of a free-flowing powder. It is also necessary that their boiling point should be low enough to permit them to be evaporated from the final powder without the latter being subjected to thermal degradation; in practice their boiling point will be at most equal to 100° C. These characteristics are satisfied, for example, by n-heptane, cyclohexane, isooctane and toluene.

The function of the surfactant of HLB ranging from 8 to 12 is to ensure the stability of the dispersion while permitting the phase inversion phenomenon described above. Those which are suitable are nonionic agents which have an HLB of from 8 to 12, such as, for example, ethoxylated alkylphenols, ethoxylated alcohols and ethers, ethoxylated fatty amines and acids and ethoxylated sorbitan derivatives or sorbitol derivatives. Sorbitan monolaurate is particularly well suited according to the invention.

Exemplary unsaturated monomers according to the present invention include the unsaturated hydrophilic monomers such as acrylic acid, methacrylic acid, acrylamide and methacrylamide, as well as their N-substituted derivatives such as N-methylolacrylamide or N-methylolmethacrylamide, cationic esters of acrylic acid or of methacrylic acid, such as dimethyl- or diethylamino(ethyl or propyl) (meth)acrylate, salts of these cationic esters of acrylic acid and quaternary ammonium derivatives of these cationic esters, for example acryloxyethyltrimethylammonium chloride (Adamguat® MC), and 2-acrylamido-2-methylpropanesulfonic acid. Such unsaturated monomers can be employed either alone or in admixture.

The preparation of the solutions of these monomers is carried out by dissolution and, if appropriate (in the case of acidic monomers) partial or complete neutralization of the monomers, conducted under cold conditions to avoid any risk of untimely polymerization at this stage.

The initiators are radical polymerization initiators. Water-soluble radical initiators are particularly well suited. They can be selected from among the peroxides, hydroperoxides, peracids, azo compounds and inorganic persalts. Sodium, potassium or ammonium persulfates are particularly preferred. In the event that the initiator is a sodium, potassium or ammonium persulfate, which are preferred initiators according to this invention, the polymerization temperature is not lower than 50° C.

The crosslinking agents which can be employed per this invention are generally compounds which have at least two sites of ethylenic unsaturation and which are copolymerizable with the unsaturated monomer, typical of these being polyol di/triacrylates or compounds reactive with the (co) polymerizates, such as diol diglycidyl ethers. The polymerization is essentially initiated by radical polymerization initiators, water-soluble such initiators being preferred since both the monomer and the polymer are themselves hydrophilic; sodium or potassium or ammonium persulfates are particularly preferred, taking account of their decomposition kinetics at the polymerization temperature. When they are indeed employed, they are generally added to the reactant mixture at the same point in time as the solution of the monomers.

In order to further illustrate the present invention and the advantages thereof, the following specific examples are given, it being understood that same are intended only as illustrative and in nowise limitative.

EXAMPLE 1

Preparation of a cationic flocculent copolymer from Adamquat and acrylamide according to the invention Sequence (a)

In a one-liter reactor fitted with means for introducing solid or liquid reactants, a stirrer, a system for purging with inert gas, a temperature probe and a heating/cooling device, 0.74 g of sorbitan monolaurate (HLB=8.6) was dissolved in 322.8 g of heptane at ambient temperature and with stirring at 600 revolutions/minute. The mixture was then heated to 70° C. and purging with nitrogen was carried out at a rate of 200 ml/min.

Sequence (b)

The following solution of monomers was prepared separately in a beaker with stirring:
(i) 58.2 g of a solution of acryloxyethyltrimethylammonium chloride containing 75% of active substance (Adamquat MC75® marketed by Elf Atochem S.A.);
(ii) 37.4 g of acrylamide;
(iii) 77.9 g of twice-demineralized water.

The total weight of the aqueous phase was therefore 173.5 g.

Sequence (c)

With the reactor being maintained at 600 revolutions/minute and the temperature at 70° C., introduction of the aqueous phase prepared in Sequence (b) was then commenced, still with nitrogen purging. This introduction continued for approximately 20 minutes.

Sequence (d)

When the aqueous phase had been introduced, 2 g of a solution containing 2% (weight) of potassium persulfate were then added to the reactor.

The polymerization then commenced rapidly, the temperature increasing above 70° C. At the end of the reaction, the temperature decreased to the established temperature of the reactor, namely, 70° C.

Sequence (e)

During the progress of the preceding stage, an aqueous solution equivalent to that prepared in Sequence (b) was separately formulated.

Sequence (f)

The stirring in the polymerization reactor was maintained at 600 revolutions/minute and the nitrogen purging at 200 ml/minute. The aqueous charge prepared in Sequence (e) was introduced therein little by little; the set temperature of the reactor was maintained at 70° C. during this introduction. After a short inhibition period, the polymerization recommenced. It was permitted to proceed for 30 minutes.

Sequence (g)

All of the heptane and most of the water were removed by distillation to provide a powder whose residual moisture content was 8%.

The flocculent hydrophilic polymer product thus obtained was characterized by a 100-$\mu$m undersize fines content of 1%, and by the viscometric properties of its solution at a concentration of 1% in twice- demineralized water (measured in a Brookfield viscometer, RTV system, spindle/rotor 4, at 20 revolutions/min):

$\eta$=5,500 mPa.s $\eta$=2,840 mPa.s with addition of 0.28 g/l NaCl $[\eta]$=5.3 dl/g T=25° C., 1M NaCl

EXAMPLE 2

Preparation of a polyacrylic thickening and superabsorbent hydrophilic polymer according to the invention Sequence (a)

In a one-liter reactor fitted with means for introducing solid or liquid reactants, a stirrer, a system for purging with inert gas, a temperature probe and a heating/controlling device, 0.81 g of sorbitan monolaurate was dissolved in 523.5 g of heptane at ambient temperature and with stirring at 600 rev/min.

The mixture was then heated to 70° C. and purging with nitrogen was carried out at a rate of 200 ml/min.

Sequence (b)

Separately, 95.26 g of an aqueous solution containing 80% by weight of acrylic acid were neutralized in a beaker with 141 g of a soda lye at a concentration of 22.5% by weight. This operation was carried out in such manner that the temperature of the solution did not exceed 25° C.

0.114 g of potassium persulfate dissolved in 5.6 g of demineralized water was then added.

Sequence (c)

With the reactor being maintained at 70° C., with stirring at 600 revolutions/minute and with nitrogen purging at a rate of 200 ml/minute, the aqueous phase prepared above was introduced therein. After a short inhibition period the polymerization commenced, the temperature increasing above 70° C. At the end of the reaction, the temperature decreased to the established temperature of the reactor, namely, 70° C.

Sequence (d)

During the progress of the preceding operation, a second aqueous phase was prepared separately by neutralizing 95.26 g of 80% acrylic acid with 141 g of a soda lye at a concentration of 22.5% by weight. This operation was carried out in such manner that the temperature of the solution did not exceed 25° C. 3.6 g of an aqueous solution containing 2% by weight of ethylene glycol diglycidyl ether were then added.

Sequence (e)

The aqueous phase prepared in sequence (d) was then introduced into the polymerization reactor as it was at the end of Sequence (c). The introduction required approximately 20 minutes. The nitrogen purging remained at 200 ml/minute and the stirring at 600 revolutions/minute. The set temperature was still fixed at 70° C. After a short inhibition period the polymerization commenced. It was permitted to continue for 30 minutes.

Sequence (f)

The internal temperature of the reactor was then again increased by adjusting the jacket to 120° C. so as to remove the water and the heptane. After complete evaporation, a hydrophilic polymer was obtained, the characteristics of which are described below.

Particle size: 100-$\mu$m undersize fines content of approximately 1%.

The viscometric properties of the product were as follows:

$\eta$ (1% in $H_2O$)>60,000 mPa.s $\eta$ (1% in $H_2O$+0.1% NaCl)=20,000 mPa.s

EXAMPLE 3

Preparation of an anionic flocculent copolymer from acrylic acid and acrylamide

Sequence (a)

In a one-liter reactor fitted with means for introducing solid or liquid reactants, a stirrer, a system for purging with inert gas, a temperature probe and a heating/cooling device, 0.74 g of sorbitan monolaurate was dissolved in 322.8 g of heptane at ambient temperature with stirring at 600 revolutions/minute. The mixture was then heated to 70° C. and purging with nitrogen was then carried out at a rate of 200 ml/min.

Sequence (b)

Separately, the following reagents were introduced into a beaker with stirring:
(i) 37.9 g of acrylic acid;
(ii) 65.5 g of a 22.5% soda lye;
(iii) 54.4 g of water;
(iv) 15.7 g of acrylamide.

The total weight of the aqueous phase was therefore 173.5 g.

Sequence (c)

With the reactor being maintained stirred at 600 revolutions/minute and the temperature at 70° C., the introduction of the aqueous phase prepared in Sequence (b) was then commenced, still with nitrogen purging. This introduction required approximately 20 minutes.

Sequence (d)

When the aqueous phase had been introduced, 2 g of a solution containing 2% (mass) of potassium persulfate were then added to the polymerization reactor.

The polymerization then commenced rapidly and the temperature increased above 70° C. At the end of the reaction, the temperature decreased to the set temperature of the reactor, namely, 70° C.

Sequence (e)

During the progress of the preceding stage, an aqueous solution equivalent to that prepared in Sequence (b) was prepared separately.

Sequence (f)

The stirring in the reactor was maintained at 600 rev/min and the nitrogen purging at 200 ml/min. The aqueous charge prepared in Sequence (e) was introduced therein little by little, and the set temperature of the reactor was maintained at 70° C. during this introduction. After a short inhibition period the polymerization commenced. It was permitted to continue for 30 minutes.

Sequence (g)

All of the heptane and most of the water were removed by distillation to provide a powder whose residual moisture content was 8%.

A flocculent hydrophilic polymer was thus obtained in which the 100-$\mu$m fines content was 1% and whose viscometric characteristics were:

$\eta$ (1% in $H_2O$)=8,400 mPa.s $\eta$ (1% in $H_2O$+0.28 g/l of NaCl)=5,000 mPa.s

[$\eta$] (T=25° C., 1M NaCl)=2.2 dl/g

EXAMPLE 4

Comparison of acrylic/polyacrylic hydrophilic polymers of "raspberry" type, produced by inverse suspension polymerization in the presence of sorbitan monolaurate (HLB=8.6) according to the prior art and according to the invention Polymer P1 was prepared with a single introduction of monomer, under the conditions of Example 2, with the following important differences:

in Sequence (a) the sorbitan monolaurate solution was maintained at 36° C.;

in Sequence (c) all of the monomer was introduced before the reactor was heated to 70° C.;

there were no Sequences (d) and (e).

These are conditions which resemble those of the prior art and are described in Example 1 of EP-A-36,463.

The polymer P2 was prepared employing two introductions of monomer, under the conditions of Example 2, with the following important differences:

in Sequence (a) the sorbitan monolaurate solution was maintained at 36° C.;

in Sequence (c) all of the monomer was introduced before the reactor was heated to 70° C.; at the end of the sequence, the reactor temperature was decreased to 10° C., in Sequence (e) the second introduction of monomer was carried out at the low temperature of the end of the preceding stage. The set temperature was attained only after the monomer had been totally introduced into the reactor.

This example is representative of the prior art described in Example 1 of EP-411,507.

Polymer P3 was the polymer according to the invention of Example 2.

Polymer P4 was a polymer according to the invention prepared via the process of Example 2, the only difference being that during Sequence (e) the introduction of the second monomer charge was carried out over 60 minutes instead of 20 minutes.

The results obtained are reported in the Table below, in which:

(1) The absorption is the intrinsic absorption capacity of the superabsorbent resin, which is measured by the so-called "tea-bag" test (measurement of the absorption and retention capacities by the "tea-bag" method, EDANA, European Association of Nonwovens). According to this test the water uptake is measured by weight relative to the weight of a dry resin enclosed in a heat-sealable paper sachet, after immersion for about twenty minutes in an aqueous solution containing 0.9% of sodium chloride and draining for about ten minutes; the same sachet is next centrifuged for three minutes at a specified speed and weighed again, and this provides the saline water retention capacity.

(2) The GST values are the setting time values. The gel GST is measured as follows: 3 g of superabsorbent powder are poured into a 250-ml beaker of 60 mm external diameter. A magnetic stirrer 45×8 mm in size is placed inside the beaker and the assembly is placed on a magnetic stirring plate. The stirring is adjusted to 600 revolutions per minute just before pouring into the beaker 100 ml of a solution of salt water at a concentration of 0.9% and simultaneously starting a stopwatch. The latter is stopped at the moment when the stirring vortex disappears. The time in seconds, shown by the stopwatch, corresponds to the gel setting time of the product.

(3) The 5 kPa CS values represent the capillary suction (CS) capacity under pressure, which is the measurement of the ability of a bed of 1.5 g of superabsorbent product to absorb a water containing 0.9 g of salt per liter under a load, here selected as 5 kPa. This involves a well-known property, referred to by the terms of capillary absorption or suction under pressure or under load (the term "absorption under load" shortened to AUL, is frequently encountered). Its operating procedure is practised universally. A description thereof is contained, for example, in EP-A1-0,258,120.

TABLE

| Hydrophilic polymer | P1 (prior art) | P2 cold (prior art) | P3 hot (according to the invention) | P4 hot (according to the invention) |
|---|---|---|---|---|
| Charge characteristics | 1 charge at 36° C. | 2 charges charge 1: 36° C. charge 2: 10° C. | 2 charges at 70° C. charge 1: 20 min charge 2: 20 min | 2 charges at 70° C. charge 1: 20 min charge 2: 60 min |
| Particle size % at | | | | |
| >630 $\mu$m | 3.27 | 14.71 | 19.19 | 16.28 |
| >500 $\mu$m | 4.76 | 11.96 | 13.08 | 18.26 |
| >315 $\mu$m | 10.12 | 22.75 | 23.26 | 32.89 |
| >224 $\mu$m | 9.82 | 11.47 | 18.02 | 20.56 |
| >100 $\mu$m | 46.13 | 28.82 | 25.29 | 11.51 |

TABLE-continued

| Hydrophilic polymer | P1 (prior art) | P2 cold (prior art) | P3 hot (according to the invention) | P4 hot (according to the invention) |
|---|---|---|---|---|
| <100 μm | 25.89 | 5.29 | 1.16 | 0.49 |
| mean diameter μm | 206 | 346 | 396 | 428 |
| GST (s) | 5 | 31 | 23 | 33 |
| Absorption (g/g) | 59 | 37 | 48 | 47 |
| 5 kPa CS (g/g) | 20.4 | 26.2 | 26 | 26.7 |

It was found that the process according to the invention provided superabsorbents which were totally comparable in quality to the polymers of the prior art, or even better overall, with the output efficiency advantages of an excellent ratio of finished product to hydrocarbon solvent employed, and a very great increase in the ease of the temperature management of the reaction sequences.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a rapidly dissolving/absorbing free-flowing powder of a hydrophilic/superabsorbent (co)polymer, comprising (a) phase inversion (co)polymerizing stirred admixture of (i) a hydrocarbonic solution of at least one surfactant having an HBL ranging from 8 to 12 and (ii) an aqueous solution of at least one hydrophilic unsaturated monomer, in the presence of an effective amount of a radical polymerization initiator and at a predetermined temperature of (co)polymerization, (b) next introducing into the medium of (co)polymerization, after (co)polymerization of said at least one hydrophilic unsaturated monomer, a second aqueous solution of at least one hydrophilic unsaturated monomer, (c) then (co)polymerizing said second aqueous solution, and (d) thence extracting the hydrocarbonic phase and water from the resulting (co)polymerizate and drying same, with the proviso (e) that said second aqueous monomer solution is introduced at a temperature of about said predetermined temperature of (co)polymerization and the volumetric ratio of said aqueous phase to said hydrocarbonic phase ranges from 0.6 to 1.2.

2. The process as defined by claim 1, said stirred admixture having first been preheated to said predetermined temperature of (co)polymerization.

3. The process as defined by claim 1, said at least one hydrophilic unsaturated monomer comprising (meth)acrylic acid, (meth)acrylamide or N-substituted derivative thereof, or a cationic ester of (meth)acrylic acid or salt or quaternary ammonium derivative thereof.

4. The process as defined by claim 1, said stirred admixture comprising at least one crosslinking agent.

5. The process as defined by claim 1, said hydrocarbonic solution comprising n-heptane, cyclohexane, isooctane or toluene.

6. The process as defined by claim 1, said at least one surfactant comprising an ethoxylated alkylphenol, an ethoxylated alcohol or ether, an ethoxylated fatty amine or acid, an ethoxylated sorbitan derivative, or a sorbitan compound.

7. The process as defined by claim 6, said at least one surfactant comprising sorbitan monolaurate.

8. The process as defined by claim 1, said predetermined temperature of (co)polymerization being about 75° C.±10° C.

9. The process as defined by claim 1, said volumetric ratio ranging from 0.7 to 1.1.

10. The process as defined by claim 1, comprising azeotropically distilling said hydrocarbonic phase and water from said resulting (co)polymerizate.

11. The process as defined by claim 1, said radical polymerization initiator comprising a peroxide, hydroperoxide, peracid, azo compound or persalt.

12. The process as defined by claim 11, said radical polymerization initiator comprising sodium, potassium or ammonium persulfate.

13. The rapidly dissolving/absorbing free-flowing powder of a hydrophilic/superabsorbent (co)polymer prepared by the process as defined by claim 1.

14. A rapidly dissolving/absorbing free-flowing powder of a hydrophilic/superabsorbent (co)polymer, having irregular nonspherical morphology and a particle size distribution ranging from 100 μm to 800 μm.

* * * * *